(12) United States Patent
Aichele et al.

(10) Patent No.: US 6,319,531 B1
(45) Date of Patent: Nov. 20, 2001

(54) METHOD FOR REHYDRATING FOOD GRANULES WITH WATER

(75) Inventors: Erich Aichele, Schoenbuchstrasse 13, Herrenberg (DE), D-71083; Manfred Vollmer, Linienstrasse 81, Deisenhofen (DE), D-82041; Christian Henge; Manfred Hoehne, both of Karlsruhe (DE); Bernd Georg Jakob Voelker, Bad Herrenalb (DE)

(73) Assignees: Erich Aichele, Herrenberg (DE); Manfred Vollmer, Deisenhofen (DE)

( * ) Notice: Subject to any disclaimer, the term of this patent is extended or adjusted under 35 U.S.C. 154(b) by 0 days.

(21) Appl. No.: 09/380,488
(22) PCT Filed: Mar. 6, 1998
(86) PCT No.: PCT/EP98/01302
  § 371 Date: Dec. 17, 1999
  § 102(e) Date: Dec. 17, 1999
(87) PCT Pub. No.: WO98/38877
  PCT Pub. Date: Sep. 11, 1998

(30) Foreign Application Priority Data

Mar. 6, 1997 (DE) ............................................. 197 09 196
Nov. 18, 1997 (DE) ............................................. 197 51 066

(51) Int. Cl.[7] ...................................................... A23L 1/00
(52) U.S. Cl. ............................................ 426/506; 426/637
(58) Field of Search ..................................... 426/506, 637; 99/536

(56) References Cited

U.S. PATENT DOCUMENTS

| 3,855,913 | 12/1974 | Harmon et al. . | |
| 3,975,549 | * 8/1976 | Shatila et al. ......................... | 426/506 |
| 4,093,125 | 6/1978 | Shatila et al. . | |
| 4,438,683 | 3/1984 | Bartfield . | |
| 4,646,627 | 3/1987 | Bartfield et al. . | |
| 5,197,376 | 3/1993 | Bird et al. . | |
| 5,272,961 | 12/1993 | Campbell et al. . | |
| 5,307,736 | 5/1994 | Sorensen . | |
| 5,536,525 | * 7/1996 | Mogilevsky et al. ................. | 426/506 |
| 5,605,091 | 2/1997 | Garber . | |
| 5,908,240 | * 6/1999 | Hood ...................................... | 366/65 |

* cited by examiner

*Primary Examiner*—George C. Yeung
(74) *Attorney, Agent, or Firm*—McCormick, Paulding & Huber LLP

(57) ABSTRACT

The invention relates to a method for rehydrating a predetermined quantity of food granules with a predetermined quantity of water. For this purpose, the water is first of all sprayed as a fine shower onto a portion of the food granules forming a first layer of granules in a chamber (22). Food granules are then deposited in layers on the first layer of granules and sprayed with water in the form of a fine shower in the chamber (22) until the predetermined quantity of food granules and water has been obtained.

8 Claims, 15 Drawing Sheets

METHOD FOR REHYDRATING FOOD GRANULES WITH WATER

BACKGROUND OF THE INVENTION

The invention relates to a method for rehydrating a predetermined quantity of food granules with a predetermined quantity of water which is applied to the food granules in a chamber.

A method of the type stated at the outset is employed particularly in vending machines or automatic machines for large kitchens which use water and rehydratable food granules to produce an edible dough which is formed into pieces of edible dough and then fried, boiled, roasted or baked. In this known method employed in automatic machines of this kind, a portion of food granules is fed into a chamber and then rehydrated with a quantity of water corresponding to a predetermined mixing ratio.

Any rehydratable granules which can be converted into an edible dough with water are suitable as food granules. For example, rehydratable potato granules can be used to produce a raw potato dough or a mixture of flour and starch can be used to produce pasta. Herbs and mixtures of herbs can be added to the food granules to suit the personal tastes of the users. To accelerate the mixing of the food granules with water, the water can be heated to a temperature of 80 to 90° C.

Thus, U.S. Pat. No. 4,646,627 describes a vending machine for French fried potatoes which produces a potato dough from rehydratable potato granules and water in accordance with the method stated at the outset. The chamber used for rehydration is a cylinder of circular cross section which is open at both ends and the lower end of which serves as an outlet opening that can be closed by a pivotable plate. The cylinder is filled with the entire predetermined quantity of potato granules through its upper open end. A rehydrating unit is then pivoted over the feed opening and deposits the predetermined quantity of water uniformly on the food granules. However, in this arrangement only the upper layers of the food granules are rehydrated, while the lower layers of granules remain unwetted. Uniform rehydration of the food granules with water is therefore not possible.

SUMMARY OF THE INVENTION

It is the object of the invention to provide a method for rehydration and a device for performing the method, in which a predetermined quantity of food granules is rehydrated uniformly with a predetermined quantity of water.

In the case of a method of the type stated at the outset, this object is achieved by virtue of the fact that water is first of all sprayed onto a portion of the food granules as a fine shower, the said portion forming a first layer of granules in the chamber, and in that food granules are then deposited in layers on the first layer of granules and sprinkled with water in the chamber until the predetermined quantity of food granules and water has been reached. The object is furthermore achieved by means of a device in accordance with Patent Claim 8 or 13. Advantageous developments of this invention will become apparent from the respectively associated subclaims.

In the method according to the invention, only a portion of the predetermined quantity of food granules is initially fed into the chamber. The first layer of granules formed in the process is then wetted with water, which is sprayed into the chamber as a fine shower. The fine shower penetrates into the lowermost sublayers of the loosely piled food granules and rehydrates them. With increasing rehydration of the accumulated food granules, the water can no longer reach the lower rehydrated sublayers through the rehydrated upper sublayers, despite its distribution, but collects in the upper sublayers. At this stage of the method, further food granules are deposited in layers on the first layer of granules and sprayed with water. The lower sublayers of the food granules deposited on the first layer of granules, the said lower sublayers adjoining the upper sublayers of the first layer of granules, then absorb the water stored in these upper sublayers. At the same time, the upper sublayers are rehydrated by the additional water sprayed in. Due to the distribution of the water as a fine shower, on the one hand, and the deposition of the food granules in layers, on the other hand, uniform rehydration of the entire predetermined quantity of food granules is in this way achieved.

In the case of food granules which rehydrate relatively quickly, the proposal is to spray each further layer of granules with water after it is deposited. This ensures that the layers of granules are uniformly moistened despite the barrier layers of rehydrated food granules which form and prevent penetration of the water into deeper sublayers.

Food granules which rehydrate relatively slowly can be sprayed with water as they are fed in. For this purpose, water is sprayed onto the food granules falling into the chamber and onto the layer of granules which is forming. This ensures, on the one hand, that the quantity of food granules fed in is uniformly mixed with water and, on the other hand, the rehydration time required for the total predetermined quantity of food granules is shortened since the food granules are rehydrated as they are fed in.

In a preferred development of the method, the water is sprayed in at least partially in a direction normal to the bottom of the chamber on which the food granules can be deposited. This ensures that the entire area of food granules deposited on the bottom of the chamber is wetted with water.

There is furthermore the possibility of spraying in water at least partially along at least one plane tangential to an imaginary cylinder standing in the chamber, in an oblique direction relative to the normal to the bottom of the chamber on which the granules can be deposited. Spraying the water in tangentially produces a circular flow in the chamber which takes the food granules along and not only rehydrates them but also subjects them to a stirring or mixing movement.

At a mean water pressure of 2 to 3 bar, the fine shower should be composed of droplets, the mean volumetric diameter of which is in a range of from 0.5 to 1.5 mm. At a droplet size of this kind, good mixing of the water with the food granules is achieved, on the one hand, especially when food granules and water are fed in simultaneously, since the food granules are sufficiently wetted and, on the other hand, the flight path of the food granules is influenced in a controlled manner by means of the droplet size.

A suitable device for carrying out the method is one in which arranged in the chamber, at a distance from the bottom of the chamber on which the food granules can be deposited, there is at least one nozzle for spraying in the water, which has a cavity that tapers in the direction of flow and the nozzle outlet opening of which, which is connected to the cavity, points in the direction of the bottom of the chamber. The nozzle outlet opening has a separation edge which is acute-angled in cross section and which atomizes the water flowing out.

To spray in the water, use is made, for example, of a single-substance nozzle, arranged in the cavity of which is a swirl insert which has an axial hole and a plurality of radial passages through which the water flows into the cavity in a circular motion. The water flowing in in a circular motion causes a circular flow in the cavity, the axial hole reducing its tangential velocity, with the result that the water is sprayed from the nozzle outlet opening as a fine conical shower. It is additionally possible to control the size of the droplets of the fine shower by regulating the pressure of the water flowing into the single-substance nozzle. If the water pressure is low, a fine shower with comparatively large water droplets is formed. If, on the other hand, the water pressure is high, a fine shower with very small water droplets is formed. This allows the rehydration time to be influenced.

Another proposal is to use a multi-substance nozzle with external mixing which has a second nozzle outlet opening, arranged concentrically to the nozzle outlet opening for the water, for a second medium supplied under pressure. The second medium supplied under pressure atomizes the water flowing out of the first nozzle outlet opening into a fine shower. In this case, the droplet size of the fine shower can be influenced in a controlled manner by increasing or reducing the pressure at which the second medium emerges from the second nozzle outlet opening. For reasons of hygiene, compressed air, steam or a mixture of compressed air and steam which emerges from the second nozzle outlet opening are particularly suitable as the second medium. Also conceivable is the use of a multi-substance nozzle with internal mixing, in which the water and the second medium are combined in the nozzle body, it being possible to influence the quantity of water by regulating the inf lowing quantity of the second medium.

In a preferred embodiment, the chamber of the device is designed as a cylinder with a symmetrical, preferably circular, cross-sectional shape, in which the nozzle is arranged concentrically and sprays the water in in the direction of the longitudinal axis of the cylinder. The symmetrical shape of the cylinder leads to uniform distribution of the fine shower which is sprayed in and falls on the layers of granules.

In addition, a piston which can be displaced in the longitudinal direction of the cylinder and on which the nozzle is mounted can be provided in the cylinder. By means of this piston, the food granules rehydrated in the cylinder can be pushed out of the cylinder via a discharge opening and, for example, pushed through a forming device. It is furthermore possible to adjust the distance between the nozzle and the surface of the respective layer of granules fed in since the nozzle is mounted on the displaceable piston, allowing the nozzle to be moved upwards as the level of food granules in the chamber rises and ensuring uniform spraying of the entire surface of the layer of granules at every point in the process.

In a second embodiment of the device for carrying out the method, at least one nozzle is arranged in such a way at a distance from the bottom of the chamber on which the food granules can be deposited that the water is sprayed in along a plane tangential to an imaginary cylinder arranged in the chamber. In this second embodiment, the food granules are not only rehydrated but also taken along by the tangential injection, which produces a circular flow in the mixing chamber, and a stirring or mixing movement is brought about.

To reinforce the circular flow of the food granule/water mixture in the chamber, the water can be sprayed in at a plurality of points in the chamber, either simultaneously or at time intervals. For this purpose, the injection points in the chamber can be arranged in a common radial plane, preferably being distributed uniformly over the cross section of the chamber. Arranging the injection points in this way, especially distributing them uniformly over the cross section of the chamber, sets the food granules uniformly in motion in the chamber at a plurality of points and the formation of accumulations of food granules is avoided.

In another advantageous version of the second embodiment of the invention, the injection points can also be formed one above the other, i.e. in radial planes arranged one above the other, producing circular flows in the various layers of granules, particularly where there are large quantities of granules in the chamber. If the injection points are arranged in this way, the water jets in the various injection planes can also be aligned in opposite directions, thereby producing opposite circular flows in different layers of granules, these opposite flows improving the mixing of the food granules with the water sprayed in.

It is furthermore particularly advantageous if the water is sprayed in obliquely to the longitudinal axis of the chamber. Spraying the water jets in obliquely ensures that the various layers of granules are mixed with one another, in addition to the circular flow already described.

In a development of one of the two devices, a chute which opens into a feed opening formed in the chamber is arranged laterally on the chamber for the purpose of feeding in the food granules. In this case, the chute is preferably arranged at an angle of 10 to 20° C. to the longitudinal axis of the cylinder. A chute of this kind is suitable, in particular, for use with food granules which rehydrate relatively rapidly. By virtue of the steep arrangement of the chute, the food granules can be fed into the chamber at high speed, thereby preventing rehydration of the food granules in the chute.

In another embodiment, a chute which can be pivoted into the chamber and in the outlet opening of which the nozzle is arranged is used to feed in the food granules. This pivotable chute is used, in particular, if the food granules are to be sprayed with water even while they are being fed in.

In a preferred embodiment of one of the two devices, the cylindrical chamber has a circular cross section and the piston has a rotary drive which can rotate the piston about its longitudinal axis. Raised portions, by means of which the food granule/water mixture can be stirred, are formed on the underside of the piston.

The mixing of the food granules with the water sprayed in can furthermore be improved if a heating device is provided on the chamber. By means of the heating device, the chamber is heated to a temperature range of 80 to 90° C., with the result that the water sprayed in does not cool down but maintains its temperature of 80 to 85° C. and thus penetrates better into the finely porous food granules.

As a closure for the discharge opening of one of the two devices, it is proposed to provide a closing plate which is mounted outside the chamber and can be pivoted in the plane of the plate. The closing plate is moved by means of its own drive, for example a positioning motor. To prevent the closing plate from sagging when the discharge opening is closed and the piston is compacting the edible dough, the closing plate can be supported by rollers in the region of the discharge opening or be held by a locking mechanism. If a heating device is provided on the chamber, as already described above, it is furthermore advantageous if the closing plate is fitted with a heating device which heats the closing plate at least partially in order to prevent condensation of water on the closing plate.

The use of a flap or slide is also possible instead of a pivotable closing plate.

In order to shorten the strips of dough emerging from the forming device to the desired length, it is furthermore proposed to provide a dough cutter on the chamber. Suitable dough cutters are, for example, a wire which can be moved through the area of the discharge opening, transversely to the latter, or a cutter blade which can be moved through the area of the discharge opening. In a preferred embodiment, the dough cutter can be pivoted through the area of the discharge opening together with the closing plate. This makes it possible to use a common drive for the closing plate and the dough cutter. Once the closing plate exposes the discharge opening, the dough cutter is in the stand-by position and cuts the strips of dough as soon as the drive of the closing plate is activated again. Instead of a dough cutter which is pivoted backwards and forwards several times underneath the discharge opening, it is also possible to use a plurality of dough cutters, which then cut the strips of dough in succession.

A wire as a dough cutter can be stretched between a hub of the closing plate, the said hub being arranged on the pivoting axis, and a web projecting radially from the hub. Instead of a wire as a dough cutter, it is also possible to use a cutter blade projecting radially from the hub. In a preferred embodiment, the dough cutter is in the form of a cutter blade on the peripheral edge of the closing plate.

BRIEF DESCRIPTION OF THE DRAWINGS

Two embodiments of a device for carrying out the method according to the invention will be explained in greater detail with reference to the drawing, in which.

DETAILED DESCRIPTION OF THE PREFERRED EMBODIMENTS

Figure 1:
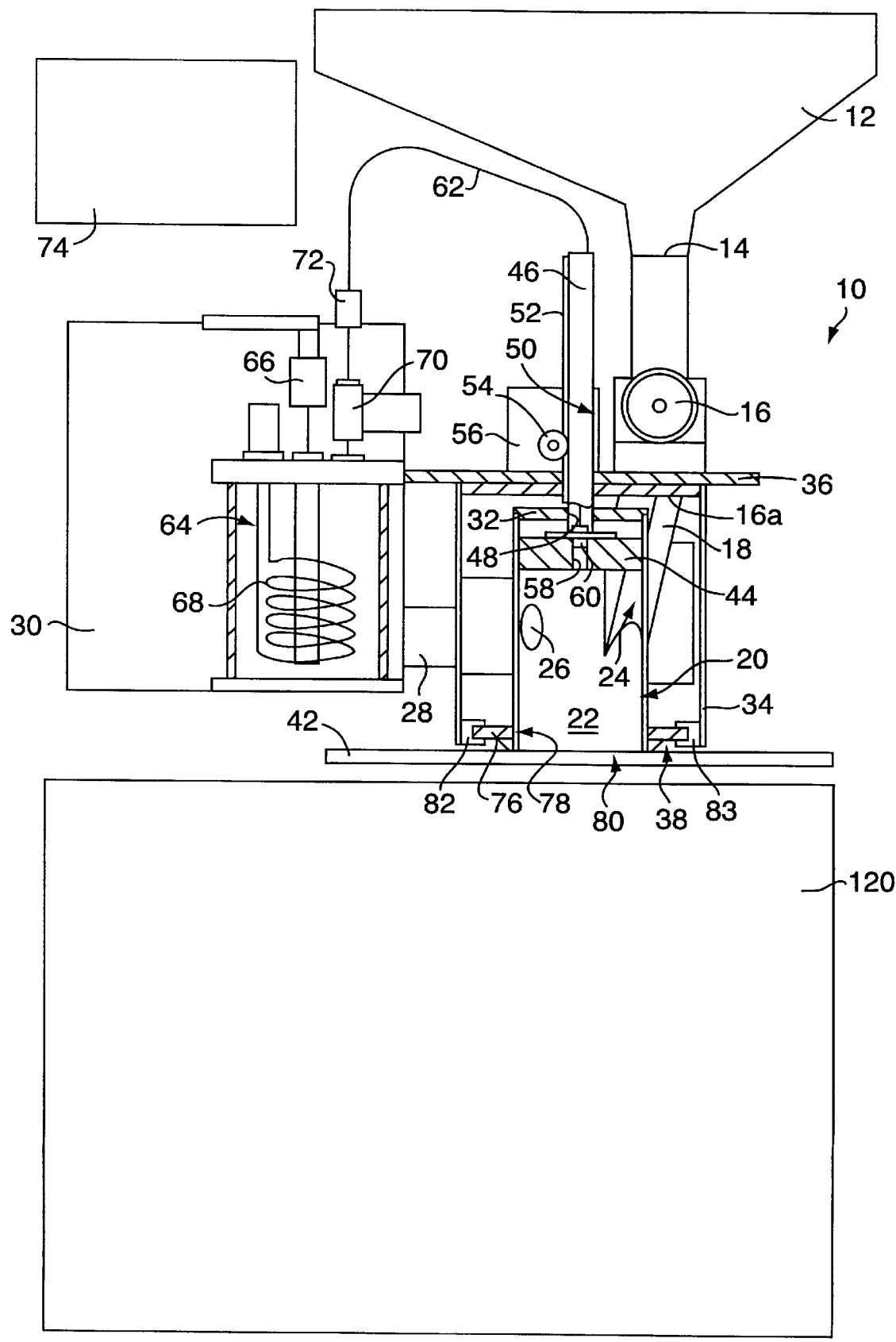
FIG. 1 is a schematic front view of a first embodiment of a device for carrying out the method according to the invention.
Figure 2:
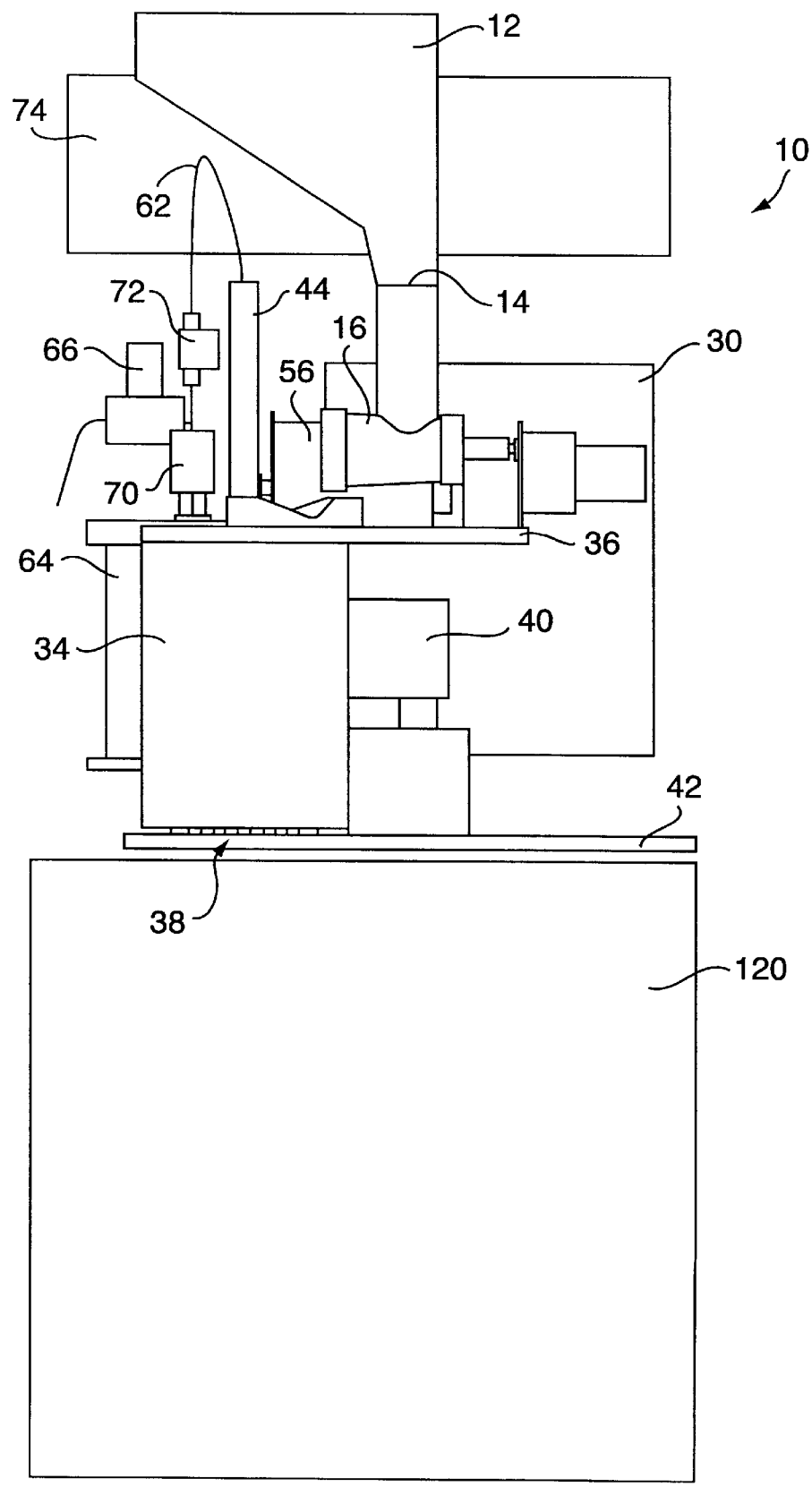
FIG. 2 is a schematic side view of the first embodiment of the device.

FIGS. 1 and 2 are schematic representations of a first embodiment of a device 10 which rehydrates food granules in accordance with a method according to the invention and is used in a vending machine for French fried potatoes. The device 10 has a granule hopper 12 filled with rehydratable potato granules which is filled with potato granules before the vending machine is put into operation. A feed screw 16 is attached to an outlet opening 14 at the bottom end of the granule hopper 12, the said end being shown on the right in FIG. 1. The feed screw 16, for its part, is connected by its outlet opening 16a to a chamber 20 via a granule chute 18.

The chamber 20 has a vertical hollow cylinder 22 of circular cross section which is open at both ends and is manufactured from high-grade steel. In its lateral surface, the hollow cylinder 22 has a feed opening 24 into which the granule chute 18 opens. Also formed in the lateral surface, at the level of the feed opening 24 and opposite the latter, is a suction opening 26, which is connected by a suction stub pipe 28 to an air induction device 30. At its open upper end, the cylinder 22 is closed by a cap 32.

The granule chute 18, the hollow cylinder 22 and the suction stub pipe 28 are arranged in a housing 34 of rectangular cross section. At the top, the housing 34 is closed by means of a cover 36 to which the feed screw 16 is attached together with the granule hopper 12. Arranged at the open bottom end of the housing 34 is a forming device 38, the structure and operation of which will be explained below. As FIG. 2 shows, the lateral surface of the housing 34 has attached to it a rotary drive 40, on the underside of which a closing plate 42 with an integrated cutting device (not shown) is rotatably mounted, which will be explained in greater detail in FIGS. 4 and 5.

Arranged in the cylinder 22 is a piston 44, which can be moved in the direction of its longitudinal axis and the hollow piston rod 46 of which is received by a guide hole 48 formed in the cap 32, projects through an opening in the cover 36 and is guided in a guide 50, which is attached to the latter and projects vertically upwards. Teeth 52 which mesh with the pinion 54 of a piston drive 56 mounted on the cover 36 are formed on the piston rod 44.

The piston 44 has a concentrically arranged through hole 58 into which a single-substance nozzle 60 is screwed. The single-substance nozzle 60 is connected to a water container 64 by a conduit 62 passed through the hollow piston rod 46. On the water container 64 there is a shut-off valve 66 via which fresh water at a line pressure of about 4 bar can flow into the water container. The water in the water container 64 is heated to an operating temperature of about 85° C. by a heating coil 68 mounted in the said container. When a solenoid valve 70 on the water container 64 is opened, the water flows via the solenoid valve 70 into the single-substance nozzle 60 through the conduit 62. The quantity of water flowing into the single-substance nozzle 60 during this process is determined by a flow meter 72 arranged in the conduit 62. The quantity of water determined by the flow meter 72 is transmitted by signal lines (not shown) to a control device 74 which, for its part, regulates the delivery rate of the feed screw 16 via signal lines (not shown) as a function of the quantity of water sprayed in.

Mounted on the cylinder 22 close to the open bottom end of the latter is a wire stretcher plate 76 by means of which the cylinder 22 is held in the housing 34 and which is part of the forming device 38, as will be explained in greater detail below with reference to FIGS. 1 and 3. The wire stretcher plate 76 has a location opening 78, by means of which it is pushed onto the cylinder 22 and at which it is welded to the cylinder 22, close to the open end of the latter, which serves as a discharge opening 80. At two of its lateral edges, the wire stretcher plate 76 is inserted into guide rails 82 and 83 mounted opposite one another in the housing 34. This type of mounting allows the cylinder 22 to be installed in and removed from the housing 34 in a simple manner.

Figure 3:
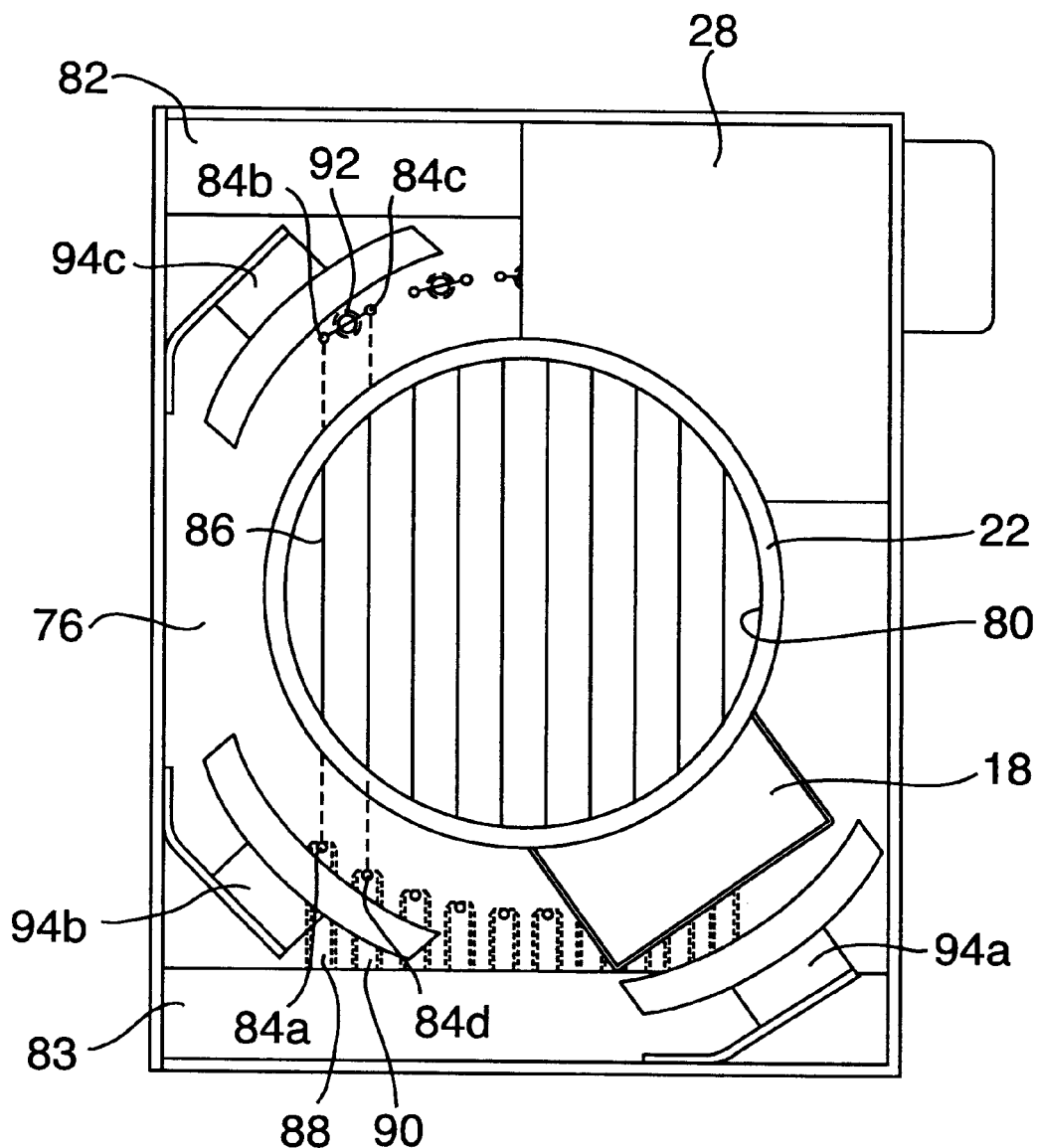
FIG. 3 is a schematic plan view of the first embodiment of the device.

As FIG. 3 shows, a plurality of stretcher holes 84 is formed in the wire stretcher plate 76 around the discharge opening 80, and a plurality of Teflon-coated wire portions 86 is stretched between these holes. In this arrangement, a single wire portion 86 forms two tension wires stretched across the discharge opening 80 by being passed through in each case four stretcher holes 84a, 84b, 84c and 84d. For this purpose, the wire portion 86 is fixed in the first stretcher hole 84a at one end by means of a screw 88. The wire portion 86 is stretched across the discharge opening 80 from the stretcher hole 46, passed through stretcher holes 84b and 84c, stretched back across the discharge opening 80 and held by its other end in the fourth stretcher hole 84d, in which it is once again fixed by means of a screw 90. A tensioning screw 92 is screwed in between the two adjacent stretcher holes 84b and 84c, its end projecting upwards out of the stretcher plate 76 and tensioning the wire portion 86, which is passed across the end.

As also shown in FIG. 3, three heating devices 94a, 94b and 94c are mounted uniformly around the cylinder 22, at a distance from the latter, in the housing 34. The heating devices 94a, 94b and 94c are used to heat the cylinder 22 to an operating temperature of 80 to 90° C. to ensure that the water sprayed in maintains its temperature of 80 to 85° C. and can penetrate more effectively into the finely porous food granules. The heating device 94a is additionally used to heat the rectangular-section granule chute 18, thereby ensuring that water which has condensed on it evaporates and preventing soiling of the granule chute 18 by rehydrated granule dust adhering to it.

Figure 4:
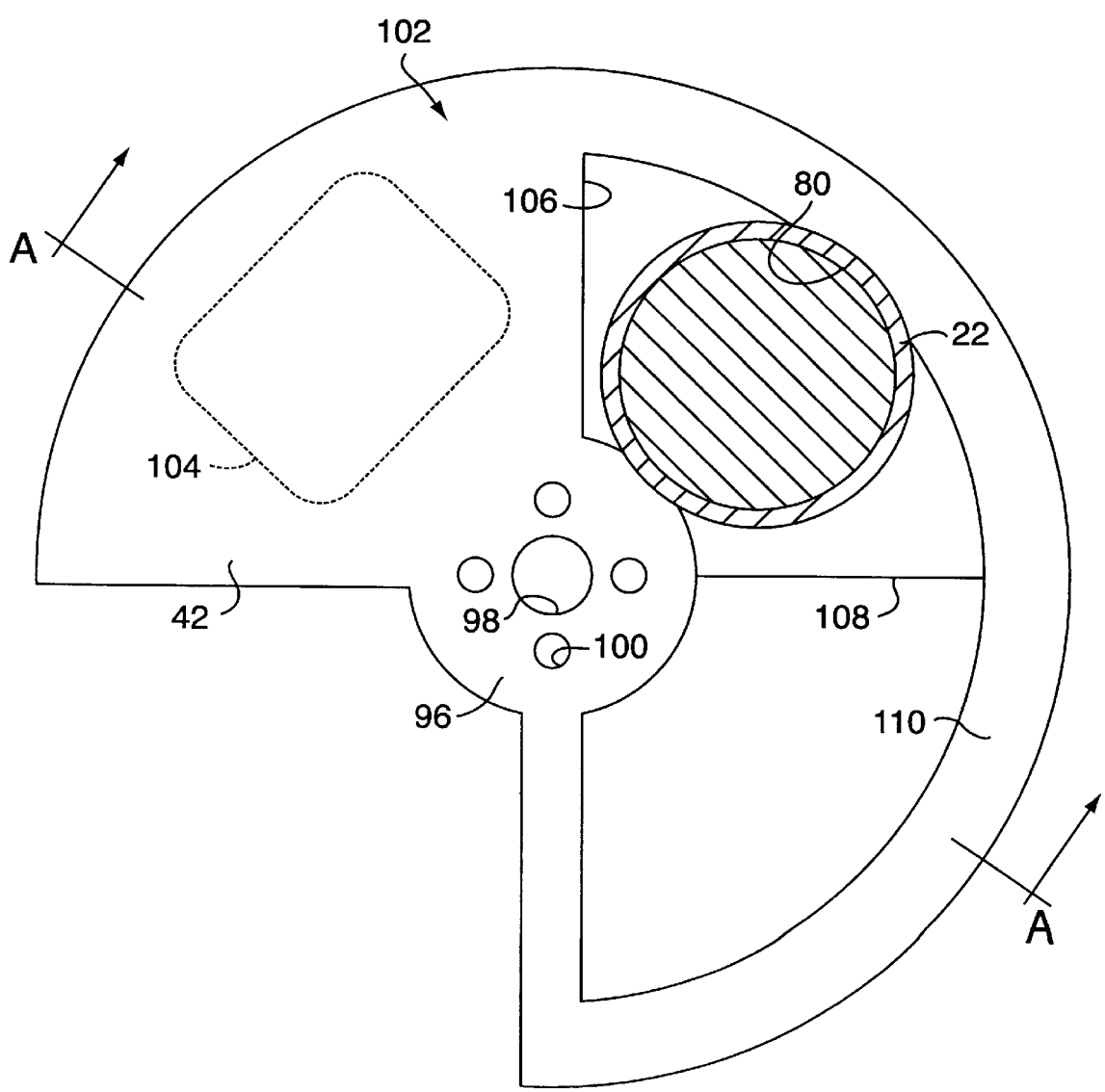
FIG. 4 is a plan view of a closing plate provided on the device shown in FIG. 1.

FIG. 4 shows the closing plate 42 in plan view. The closing plate 42 is in the form of a circular segment and has at its centre a hub 96 in which is formed a centering hole 98. Four through holes 100 are formed concentrically around the centering hole 98. To secure it on the rotary drive 40, the closing plate 42 is pushed onto the outlet shaft of the rotary drive 40 by means of the centering hole 98 and screwed to a flange provided on the drive shaft by means of screws located in the through holes 100.

Figure 5:
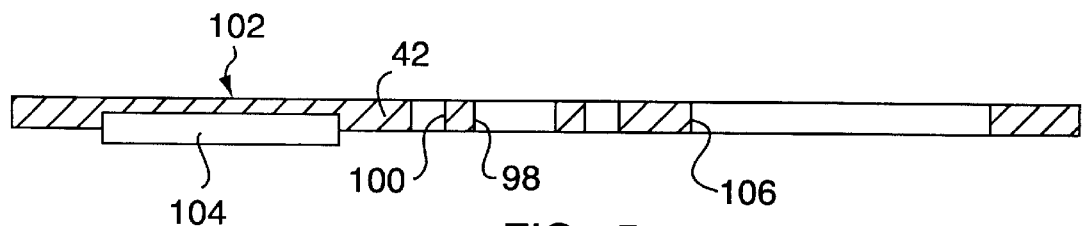
FIG. 5 is a section along line of section A—A through the closing plate shown in FIG. 4.

As illustrated on the left in FIG. 4, the closing plate 42 has a closure portion 102. As FIG. 5 shows, this closure portion 102 can be heated by means of a heating device 104 mounted on the underside of the closing plate 42 in the region of the closure portion 102. The upper side of the closure portion 102 is coated with Teflon. As shown in FIG. 4, the closure portion 102 is adjoined by an approximately semicircular through opening 106, the spacing between its semicircular peripheral edges corresponding approximately to the diameter of the discharge opening 80 of the cylinder 22, which is illustrated in section in FIG. 4. A radial cutting wire 108 is stretched across the through opening 106 between the hub 96 and an outer rim portion 110 of the closing plate 42, symmetrically with respect to the through opening 106. As will be explained below, this cutting wire 108 serves as a dough cutter.

Figure 6:
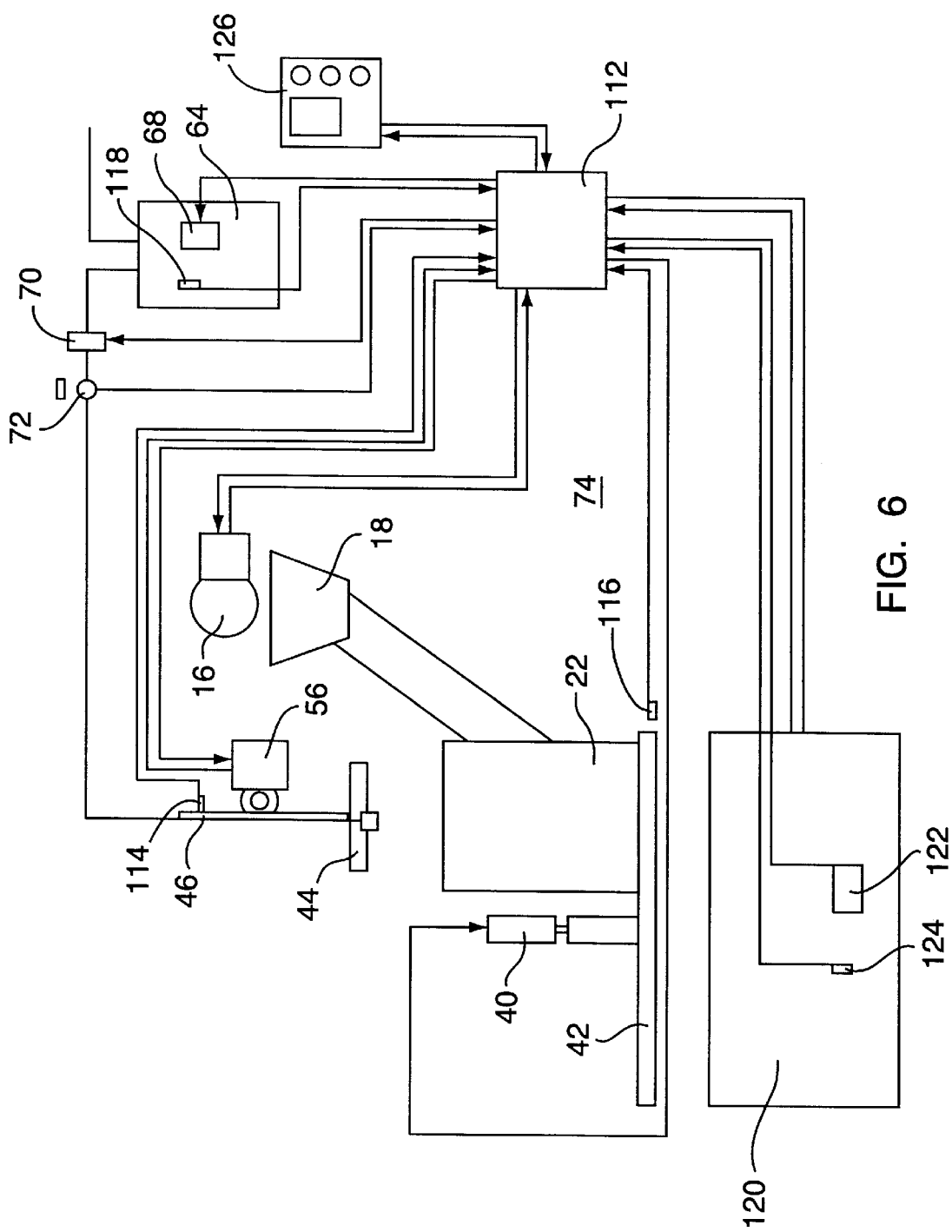
FIG. 6 is a block diagram of the device shown in FIG. 1, FIGS. 7a to 7d are flow diagrams which show the operation of the device illustrated in FIG. 1.

FIG. 6 shows a block diagram of the control device 74 by means of which device 10 is operated. The control device 74 has a central processing unit 112, which is connected by signal lines to the drive of the feed screw 16, the piston drive 56 and the rotary drive 40 of the closing plate 42. By means of a rotational-speed sensor (not shown), mounted on the drive of the feed screw 16, the central processing unit 112 detects the feed rate and hence the quantity of granules to be fed into the cylinder 22 via the granule chute 18. On the piston drive 56 there is a force sensor (not shown) by means of which the central processing unit 112 measures the force arising during the compression of the edible dough in order to control the piston drive 56 in accordance with a predetermined value. Arranged close to the piston drive 56 there is furthermore a first position sensor 114, by means of which the position of the piston rod 46 and hence the position of the piston 44 is detected. Arranged close to the closing plate 42 is a second position sensor 116, by means of which the various positions of the closing plate 42 are detected during compaction and dough cutting.

The central processing unit 112 is furthermore connected to the water preparation facility of the device 10. Thus, the central processing unit 112 detects the water temperature by means of a temperature sensor 118 in the water container 64 and switches the heating coil 68 on if the water temperature falls below a predetermined value.

Finally, the central processing unit 112 also controls a fryer 120, which is arranged underneath the closing plate 42 and by means of which the raw pieces of dough are fried. For this purpose, the central processing unit 112 is connected to a heating device 122 by means of which the oil in the fryer 120 is heated to the required frying temperature of about 140° C., and to a second temperature sensor 124, which measures the temperature of the frying oil. The central processing unit 112 also controls the transport of the French fried potatoes to be fried within the fryer 120 and the discharge of the fried French fried potatoes from the fryer 120. The control device 74 is operated from a control panel 126, which is connected to the central processing unit 112 by lines. Since the device 10 is used in a vending machine, a coin-acceptor unit (not shown) for the sum of money to be paid and a cup dispenser unit (not shown) for the fully fried French fried potatoes are furthermore provided on the device 10, these likewise being connected to the central processing unit 112.

The operation of the device 10 will be explained in greater detail below with reference to the flow diagrams illustrated in FIGS. 7a to 7d. As soon as the device 10 has been activated by insertion of a sum of money into the coin-acceptor unit (not shown), it is started in step S101. During the starting process, the hardware and software are initialized in steps S103 and S105. The process parameters, such as the water temperature, the quantity of granules, the quantity of water and the like, are then read into the central processing unit 112 from a ROM (not shown) in step S107. As soon as the initialization processes in steps S103 to S107 are complete, rehydration begins in step S109, and the temperature regulation routine is begun simultaneously in step S163. In the temperature regulation routine, the water temperature is measured by the first temperature sensor 118 and the frying-oil temperature by the second temperature sensor 124 at regular time intervals in step 165, and these temperatures are compared in step 167 with correspondingly predetermined desired values. If the water and the oil temperature correspond to the desired value, the routine returns to step S165. Otherwise, the control device continues with step S169, in which the heating device 104 of the water container 64 and/or the heating device 122 of the fryer 120 is adjusted. This gives a closed temperature control loop in which both a water temperature of about 80° C. and a frying-oil temperature of about 140° C. are ensured during the operation of the device 10.

As already explained above, the control device 74 of the device 10 begins rehydration in step S109. For this purpose, the position of the closing plate 42 is first of all detected in step 111 and the closing plate is closed by means of the rotary drive 40 if required. In step S113, the piston 44 is then moved into its initial position, which is likewise detected by the central processing unit 112. As soon as this operation is complete, the central processing unit 112 starts the drive of the feed screw in step S115, its rotational speed being continuously monitored. The rotational-speed measurement and the process parameters initialized beforehand in step S107 allow the central processing unit 112 to determine precisely the quantity of granules fed into the cylinder 22. The feed screw 16 is kept in operation until a first predetermined portion of food granules has been fed into the hollow cylinder 22 from the granule hopper 12 via the granule chute 18. The solenoid valve 70 of the water supply is then opened in step S117, with the result that the water heated to the operating temperature passes into the cylinder 22 via the conduit 72 and the single-substance nozzle 60 simultaneously with the food granules, which continue to be delivered by the feed screw 16.

Figure 8:
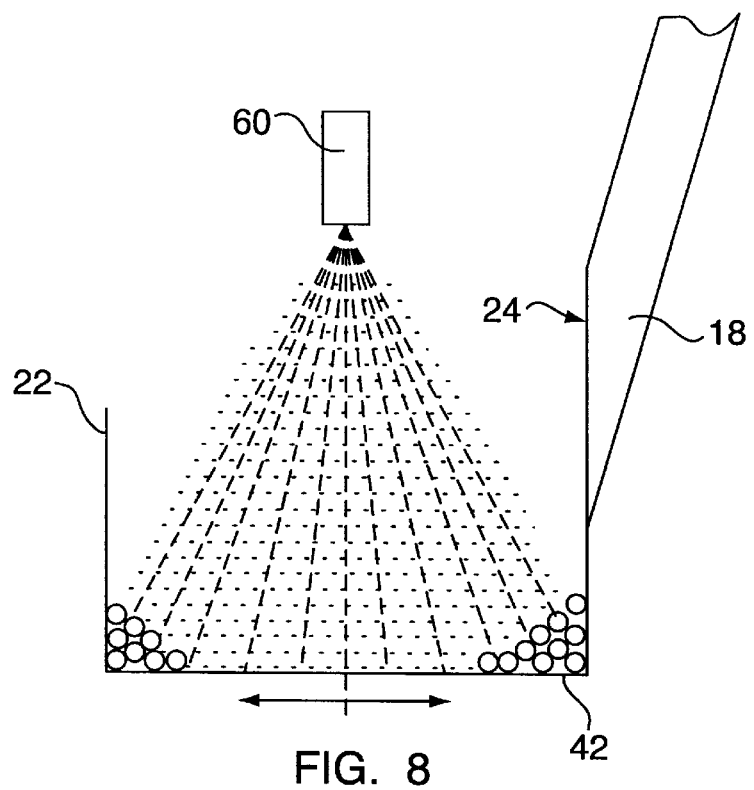
FIG. 8 is a basic representation of the action of the water droplets sprayed onto the first layer of granules.

FIG. 8 shows the action of the water sprayed in on the first layer of granules as an elementary diagram. The first portion of granules fed into the cylinder 22 forms a first layer of granules of uniform thickness on the bottom of the cylinder, which is defined by the closing plate 42. As explained above, the water is then sprinkled in through the single-substance nozzle 60 arranged concentrically in the cylinder 22, the droplets of the spray having a mean volumetric diameter of 0.5 to 1.5 mm. Owing to the speed of the individual water droplets and their respective mass, the water droplets have a momentum sufficient to displace the loose layer of granules away from the centre of the cylinder 22 in the direction of its inner peripheral surface along the smooth surface of the closing plate 42, as indicated by the double arrow in FIG. 8. The granules mixed with water, which accumulate at the gap between the cylinder 22 and the closing plate 42, rehydrate and form a ring of edible dough which seals off the gap between the cylinder 22 and the closing plate 42.

Figure 9:
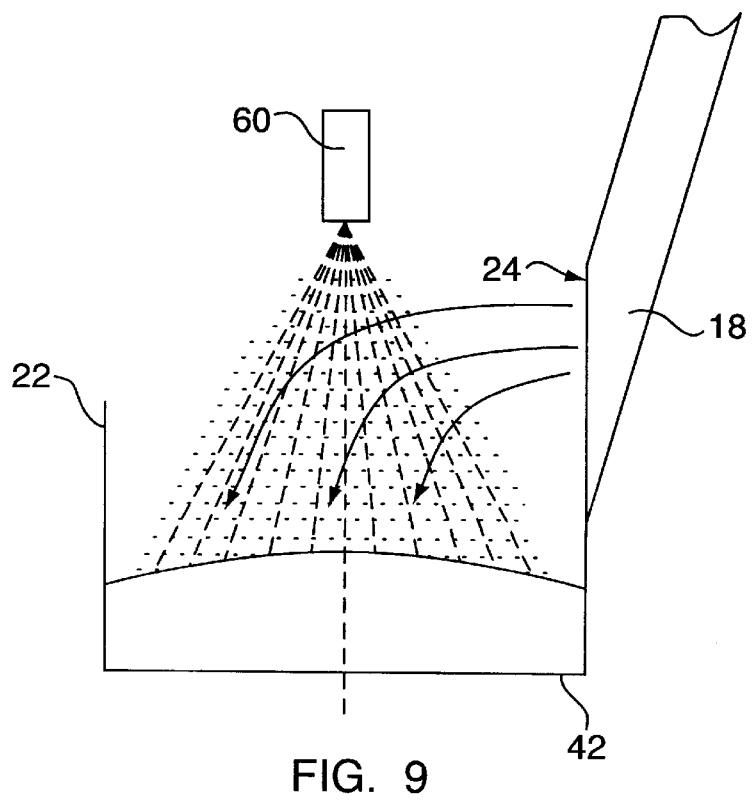
FIG. 9 is a basic representation of the action of the water droplets sprayed in when water and granules are introduced at the same time.

As simultaneous introduction of food granules and water into the cylinder 22 continues, the flight path of the granules fed into the cylinder 22 is affected by the momentum of the water emerging from the single-substance nozzle 60. This process is shown in FIG. 9, which shows the action of the water sprayed in in the case of simultaneous introduction of water and granules. In this case, the flight path of the simultaneously introduced granules is influenced in a controlled manner by the momentum of the water sprayed in through the single-substance nozzle 60 to ensure a uniform layer of granules in the cylinder 22. Thus, it is possible through controlled adjustment of the droplet size by changing the pressure at the single-substance nozzle 60 to slow down the granules emerging from the feed opening 24 and falling into the cylinder 22 by means of the momentum of the water droplets and hence to change the flight path of the granules, as indicated by the arrows in FIG. 9.

Figure 7A:
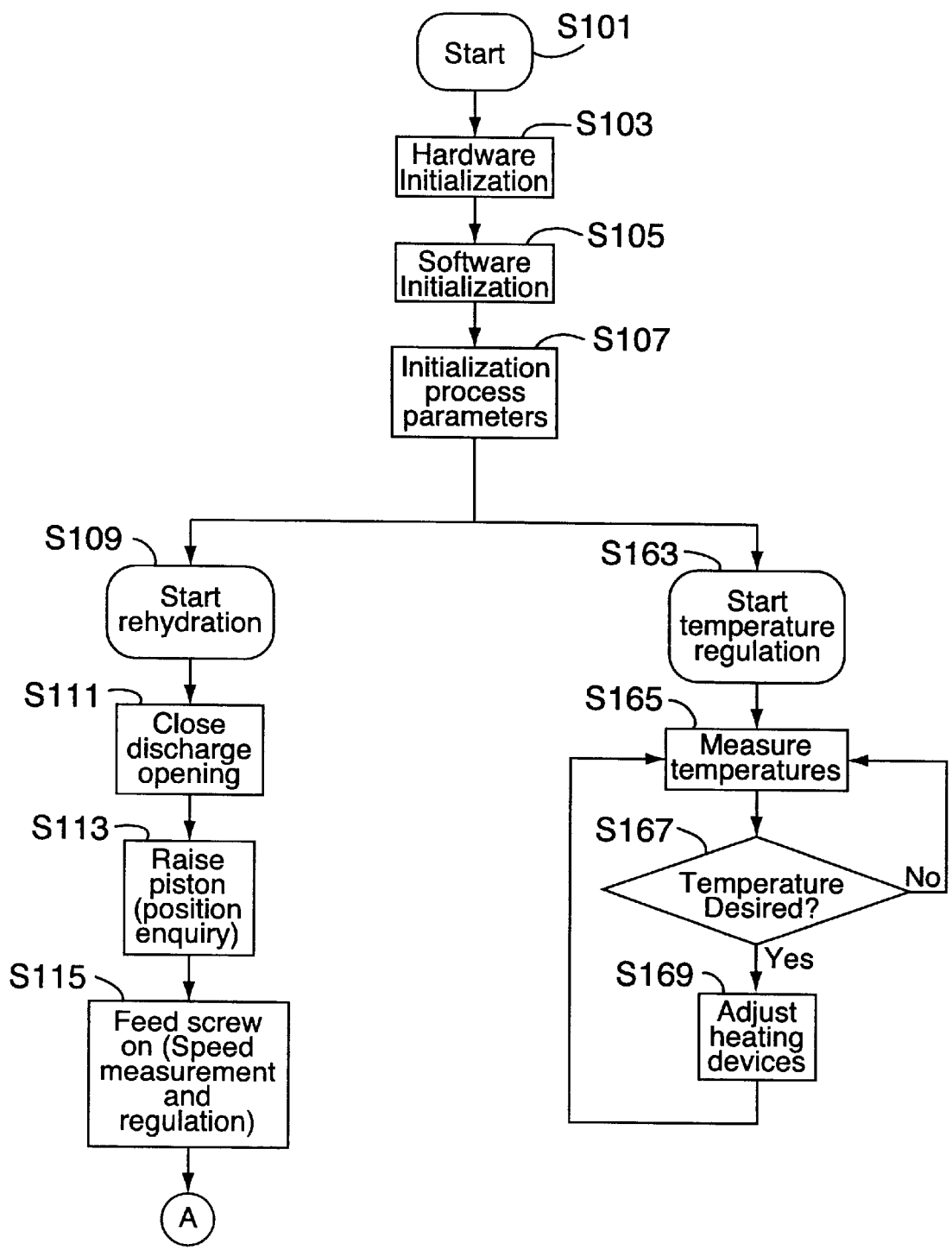
Figure 7B:
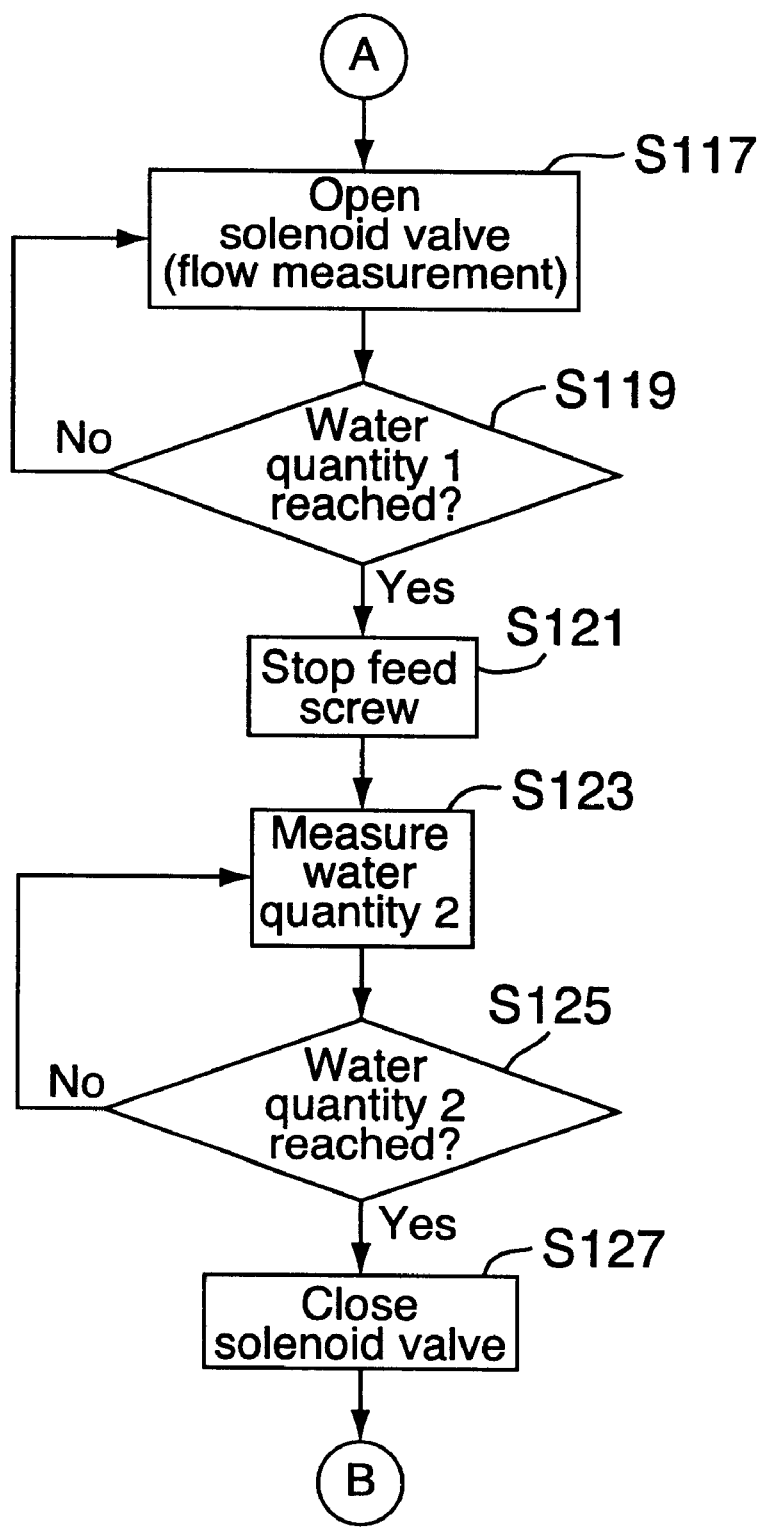
Figure 7C:
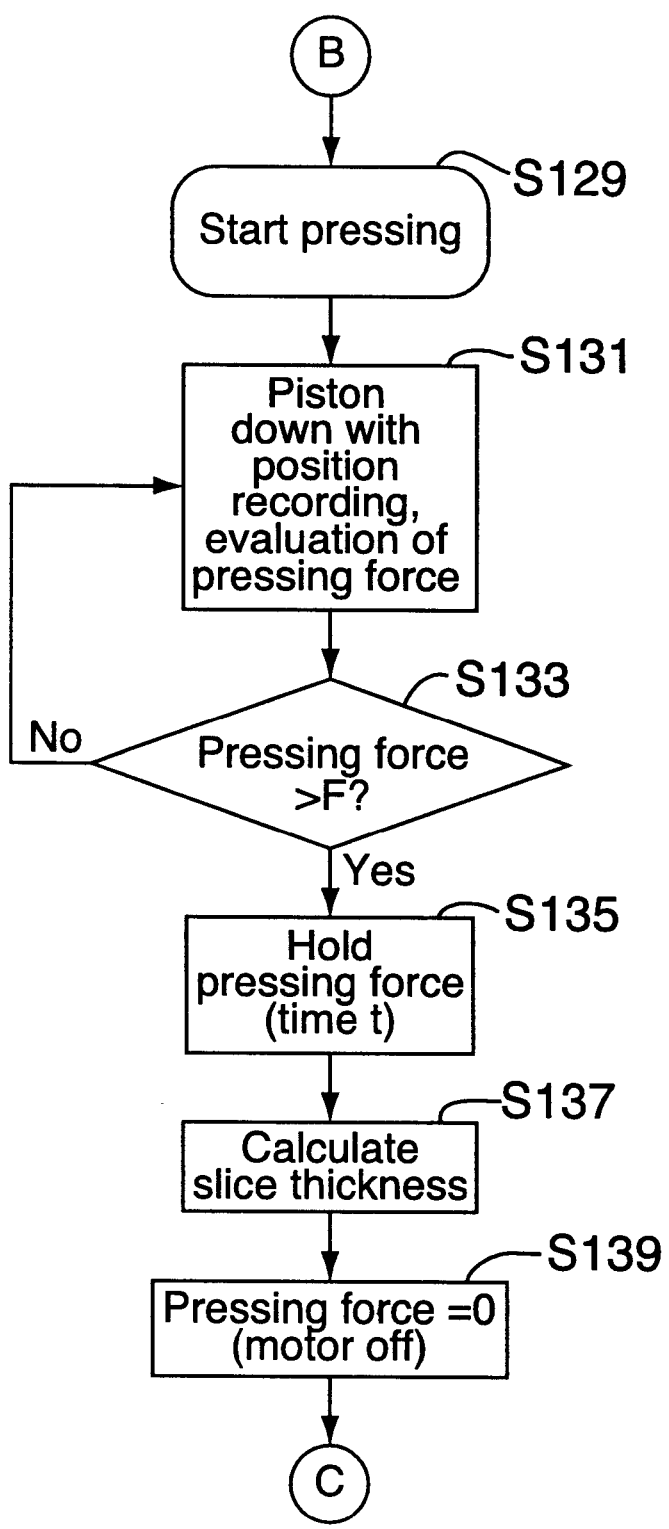

As shown in step S119 in FIG. 7b, the central processing unit 112 determines at regular intervals by means of the flow meter 72 whether the quantity of water sprayed in has reached a predetermined value. If this is the case, then, in step S121, the feed screw 16 is halted while the solenoid valve 70 remains open as before to ensure that water continues to be sprayed into the cylinder 22 to rehydrate the edible granules fed in last. In steps S123 and S125, the central processing unit 112 continuously measures the quantity of water fed into the cylinder after the stopping of the feed screw 16. As soon as the quantity of water reaches a second predetermined value, it closes the solenoid valve 70 in step S127. The control device 74 then begins with the compression of the edible dough in step S129.

To compress the edible dough, the piston 44 is moved downwards in step S131, the pressing force and the position of the piston 44 being continuously determined. In step S133, the pressing force determined by the force sensor is compared with a predetermined value. As soon as the pressing force determined corresponds to the predetermined value, the control device 74 stops the downward movement of the piston 44 and holds it in the position reached for a predetermined time t (step S135). During this operation, however, the piston drive 56 is not switched off by the central processing unit 112. On the contrary, it is operated at a power sufficient to maintain the required pressing force. During pressing, the central processing unit 112 calculates in step S137 the slice thickness subsequently to be cut and hence the number n of layers. As soon as the time t has expired, the piston drive 56 is switched off so that the pressing force falls to 0. The control device 74 then begins shaping in step S141.

For the purpose of shaping, the control device 74 opens the discharge opening 80 in step S143 by pivoting the closing plate 42 into a second position, in which the through opening 106 formed in it exposes the discharge opening 80 of the cylinder 22. As soon as the central processing unit 112 detects that the discharge opening 80 has been opened, the piston 44 is moved downwards in step S145 so that it pushes the edible dough in the cylinder 22 out of the discharge opening 80 through the forming device 38. In the process, the edible dough pushed through the discharge opening 80 is cut into dough slices by the wire portions 86. As soon as the piston has been lowered by a predetermined distance, it is halted and the rotary drive 40 is reactivated in step S147 in order to turn the closing plate 42 further. In the process, the cutting wire 108 stretched across the through opening 106 cuts the dough slices into dough strips which fall into the fryer 120 arranged underneath the device 10, in which they are fried. This process is repeated until the central processing unit 112 detects in step S149 that the penultimate layer has been cut. In step S151, the last layer is then pushed out of the discharge opening 80 by the piston 44 and cut off by the closing plate 42. Once the last layer has been cut, the production of the raw French fried potatoes is complete (step S155).

Figure 7D:
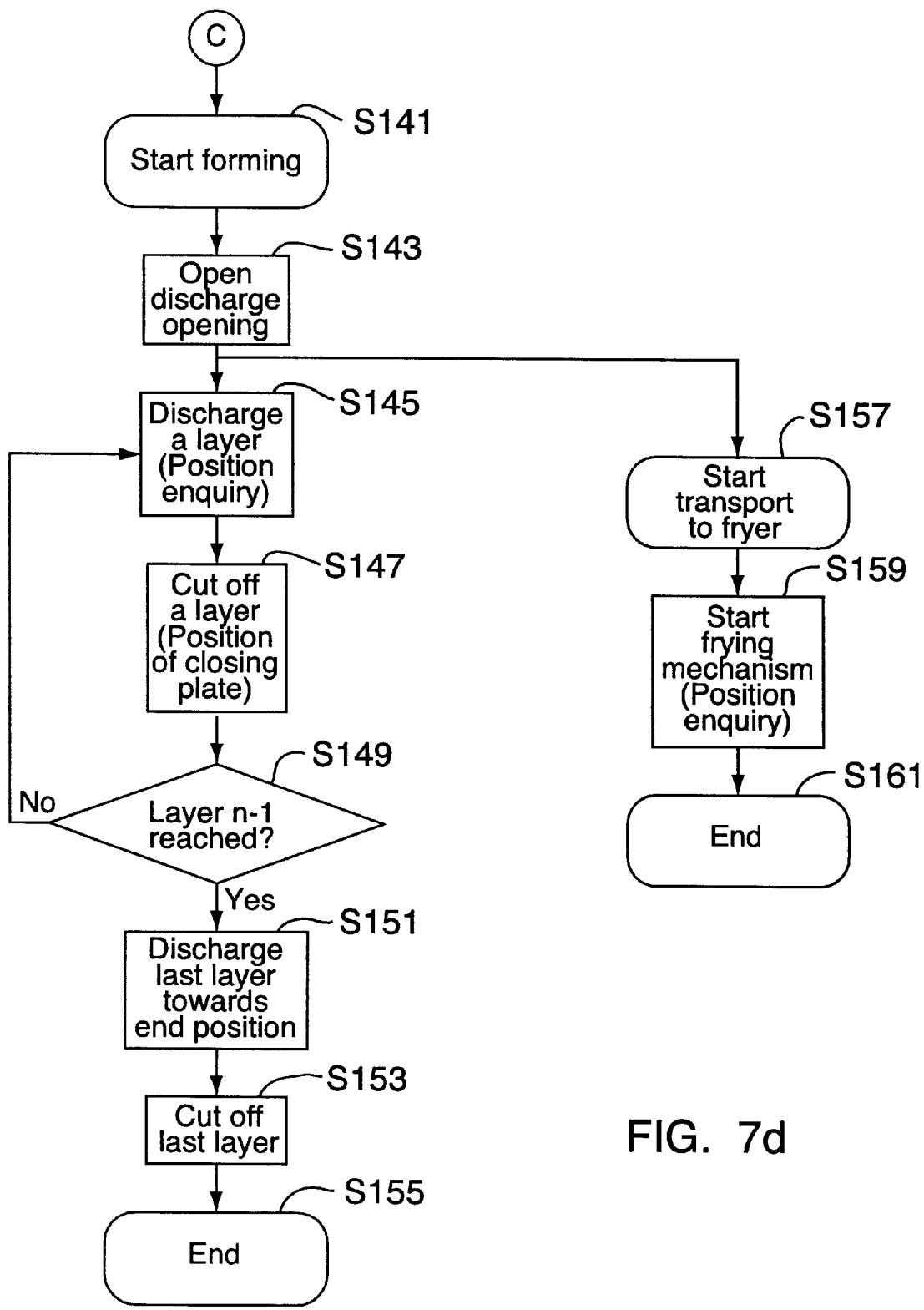

As FIG. 7d shows, transport in the fryer 120 is switched on in step S157 as soon as the discharge opening 80 has been opened in step S143. In step S159, the frying mechanism is then started, by means of which the French fried potatoes to be fried are transported through the frying oil and discharged from the fryer 120. Once the last portion of French fried potatoes has been transferred from the fryer 120 to the cup dispenser, the frying process is ended in step S161. As soon as the central processing unit 112 reaches step S161, the device 10 is switched back into a rest position, in which it waits for renewed activation.

Instead of feeding the granules into the cylinder 22 at the same time as the water is sprayed in in the device 10, it is also possible for the granules to be fed into the cylinder 22 in layers and for each layer of granules to be sprayed separately. With this rehydration method too, however, a first layer of granules should be formed first in the cylinder 22 in order to seal off the transition between the cylinder 22 and the closing plate 42.

The movement caused by the momentum of the water sprayed in can also be used in a controlled manner when introducing granules and water alternately in order to mix the granules and produce a uniform edible dough.

Different chutes that can be used in the device 10 or else in the device explained below with a tangential spraying action are described below.

Figure 10:
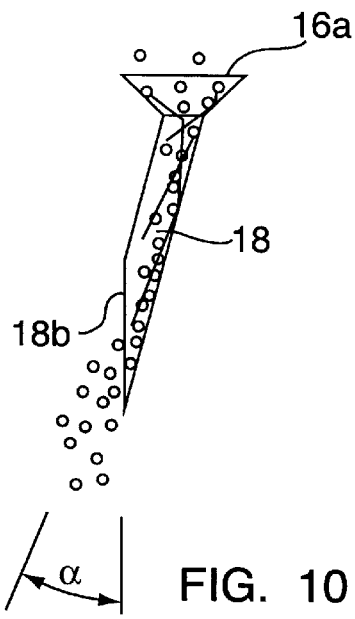
FIG. 10 is a schematic representation of a chute for food granules.

FIG. 10 shows the granule chute 18, which is inserted into the central unit 10. The granule chute 18 is arranged at an angle of approximately 15° C. to the longitudinal axis of the cylinder 22. Owing to the steep slope angle of the granule chute 18, the individual granules fall into the cylinder 22, rebounding off the inner wall of the granule chute. This gives rise to a discharge angle α of 15 to 20° C., for example.

Figure 11:
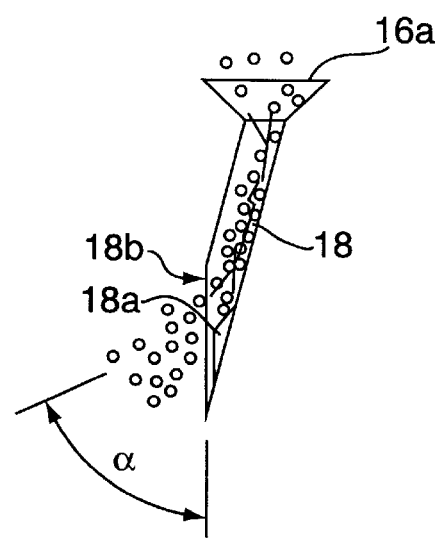
FIG. 11 is a schematic representation of the chute shown in FIG. 10 with a baffle inserted.

To increase the discharge angle α, a baffle 18a which slows the rate of fall of the individual granules is additionally mounted in the granule chute 18, as shown in FIG. 11. The baffle 18a is mounted close to the outlet opening 18b of the granule chute 18 and projects at an angle of about 10° into the cross section of the granule chute 18. This measure widens the discharge angle α to about 60° C.

Figure 12:
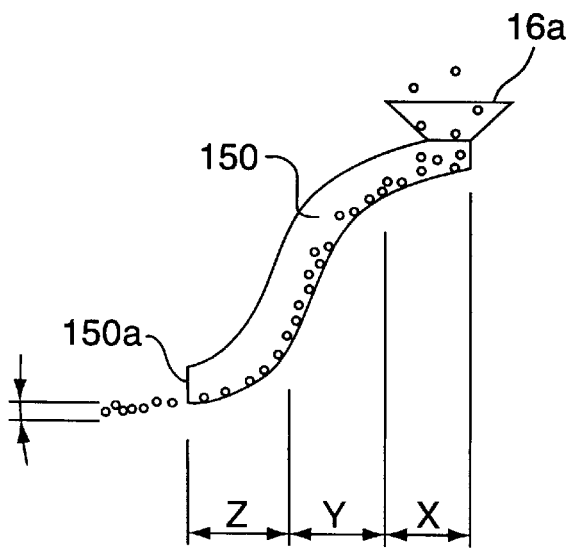
FIG. 12 is a schematic representation of an S-shaped chute for food granules.

FIG. 12 shows a modified, S-shaped granule chute 150. When installed, the granule chute 150 has a calming section x which extends approximately at right angles to the longitudinal axis of the cylinder 22 and merges into an acceleration section y which slopes at an angle of about 15° C. to the longitudinal axis of the cylinder 22. The acceleration section y merges into a guide section z, which is parallel to the calming section x and opens into the outlet opening 150a of the granule chute 150. In the case of granule chute 150, the granules are first of all slowed down in the calming zone x and then slide at increased speed along the inner wall of the granule chute 150 through the acceleration section y. Finally, the guide section z guides the stream of granules in the desired direction.

Figure 13:
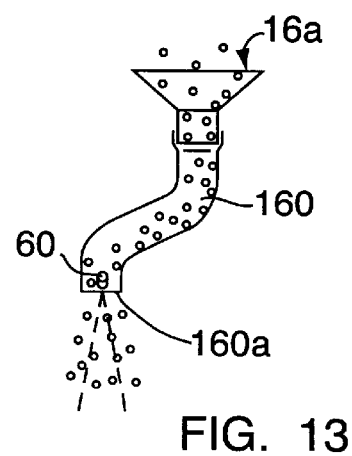
FIG. 13 is a schematic representation of a pivotable chute for food granules.

FIG. 13 shows a granule chute 160 which is pivotably mounted at the outlet opening 16a of the feed screw 16. The single-substance nozzle 60, by means of which the water is sprayed into the cylinder 22, is mounted centrally in the circular outlet opening 160a of the granule chute 160. If food granules are now fed into the cylinder 22 via the granule chute 160, they fall out of the outlet opening 160a and are simultaneously sprayed with water as a fine shower via the single-substance nozzle 60 arranged concentrically in the outlet opening 160a. Once the feeding process is complete, the layer of granules formed in the cylinder 22 can continue to be sprayed with water until the quantity of water required for the rehydration process has been reached.

Figure 14:
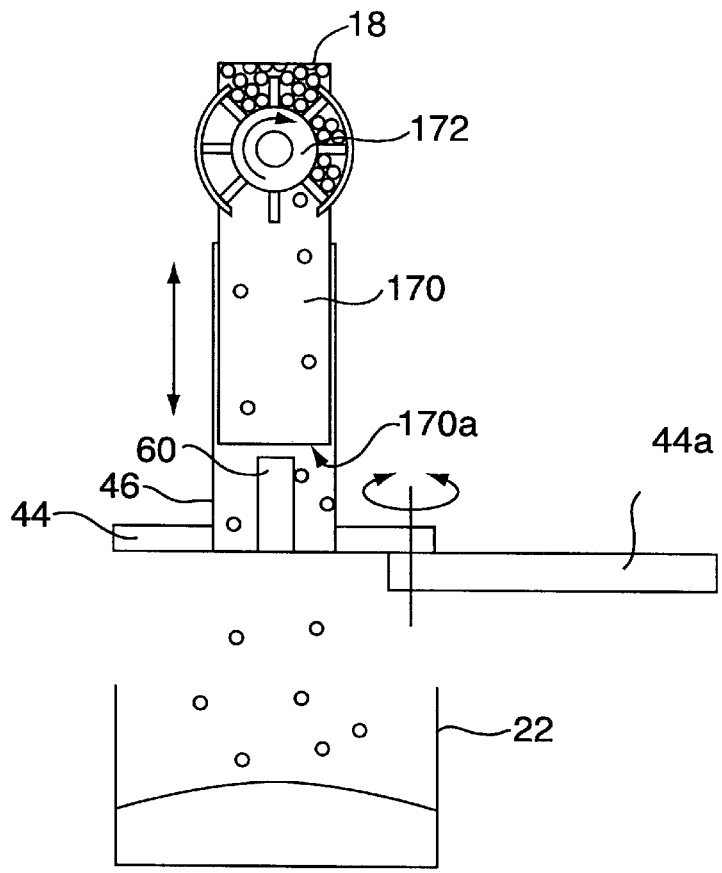
FIG. 14 is a schematic representation of a chute for food granules, which is arranged concentrically in the cylinder of the device shown in FIG. 1.

FIG. 14 shows another granule chute 170 which can be used in the device 10. The granule chute 170 is designed as a tube with a circular cross section and is arranged concentrically with respect to the cylinder 22 of the device 10. Instead of the feed screw, there is a star feeder 172 mounted at the inlet end of the granule chute 170, the said star feeder taking a predetermined quantity of granules from the granule hopper 12 upon each revolution. The granule chute 170 simultaneously serves as a guide for the piston 44, the piston rod 46 of which is designed as a hollow section with a circular cross section which can be pushed onto the granule chute 170. Mounted concentrically in the centre of the hollow piston rod 46 is the single-substance nozzle 60, by means of which the water is sprayed into the cylinder 22. To protect both the outlet opening 170a of the granule chute 170 and the single-substance nozzle 60 during the compaction and discharge of the edible dough, a pivotable piston plate 44a is provided on that side of the piston 44 which faces the cylinder 22. The piston plate 44a is mounted pivotably on a shaft extending to the side of the longitudinal axis of the piston 44 and parallel to the said axis and can be pivoted backwards and forwards between an open operating position, in which the outlet opening 170a and the nozzle 60 are exposed, and a closed operating position, in which the outlet opening 170a and the nozzle 60 are protected.

Figure 15:
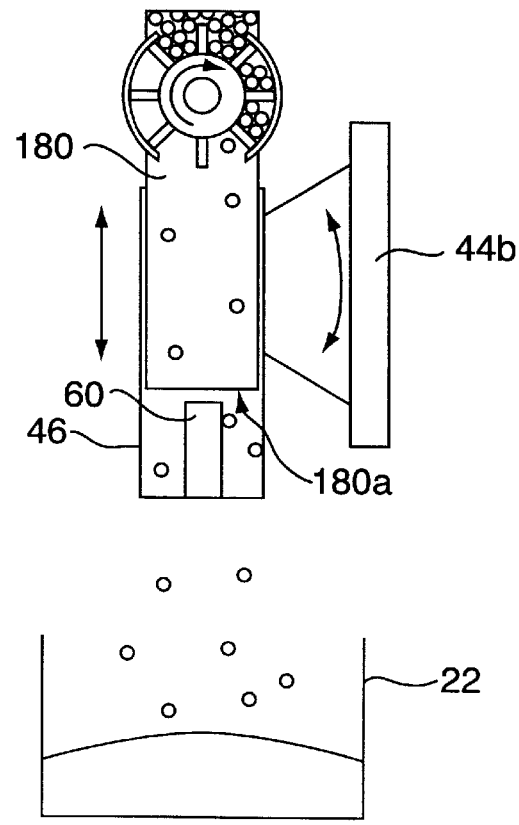
FIG. 15 is a schematic representation of a second embodiment of a concentrically arranged chute for food granules.

FIG. 15 shows a modification of the granule chute 170 described in FIG. 14. The structure of the granule chute 180 corresponds essentially to the structure of the granule chute 170 shown in FIG. 14, with the difference that the piston plate 44b by means of which the outlet opening 180a and the single-substance nozzle 60 are protected, is pivotably mounted on a shaft which lies transversely to the longitudinal axis of the piston 44.

Figure 16:
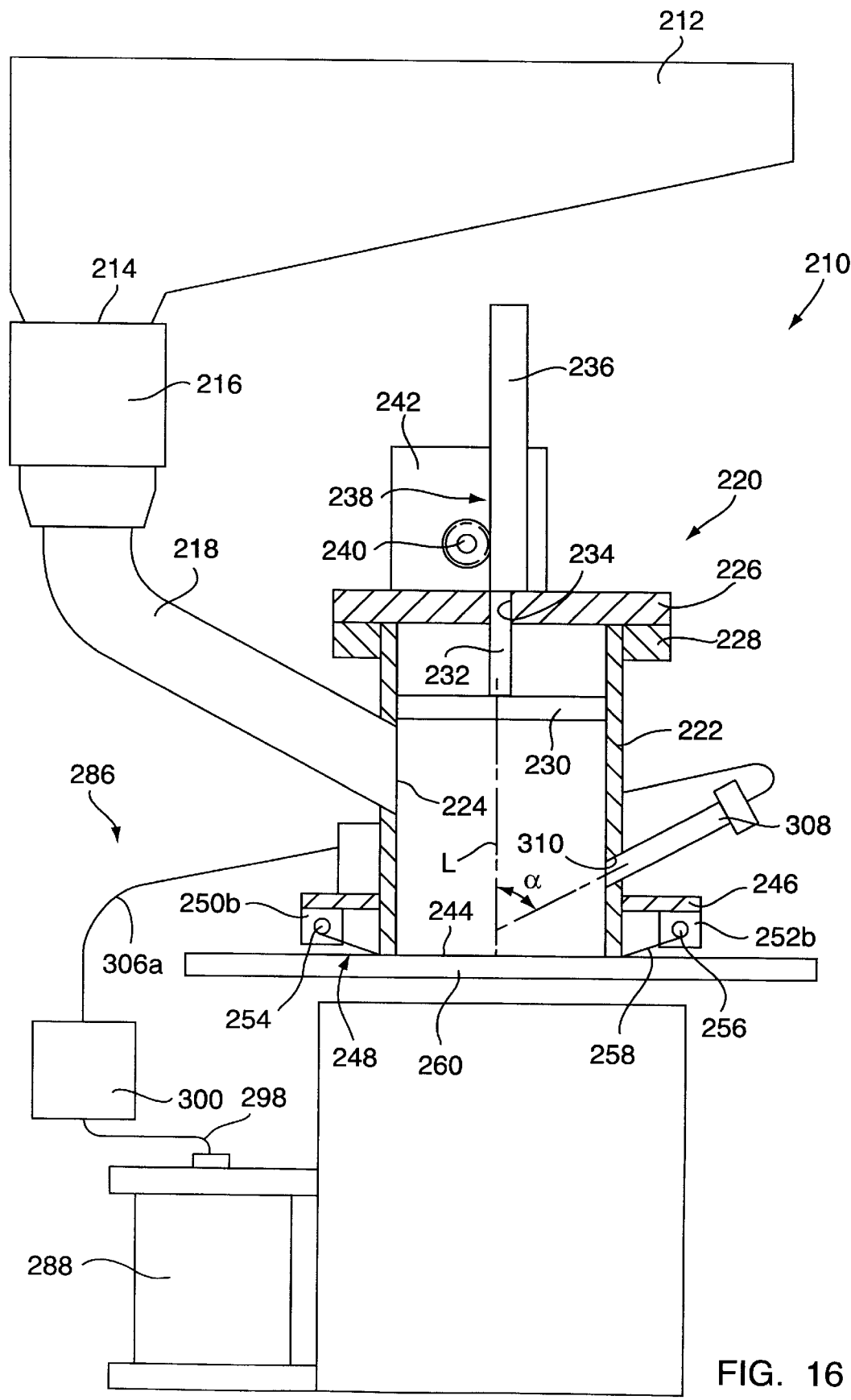
FIG. 16 is a schematic representation of a second embodiment of a device for carrying out the method according to the invention.
Figure 17:
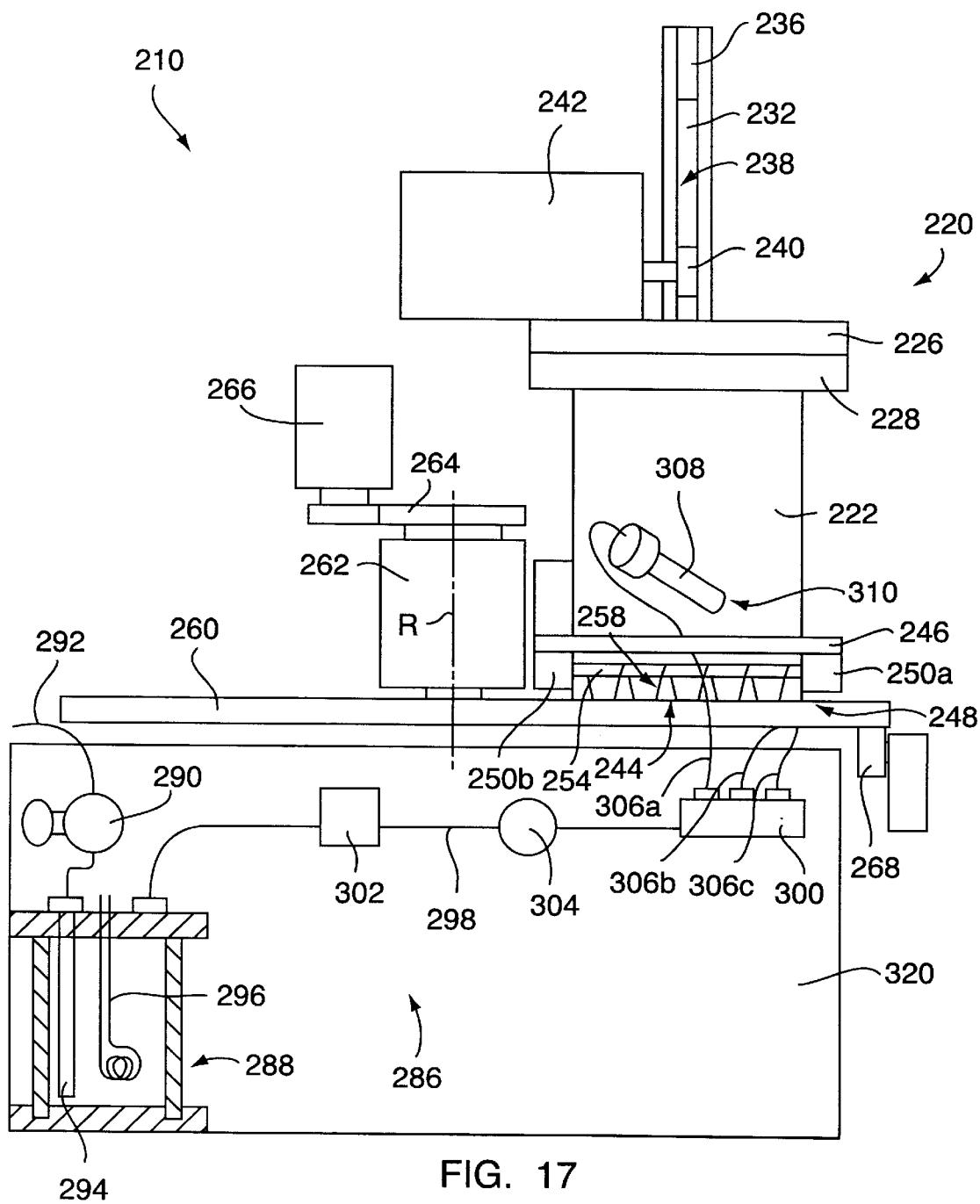
FIG. 17 is a schematic side view of the device shown in FIG. 16.

Another device 210 suitable for carrying out the method is described below. FIGS. 16 and 17 give a schematic representation of the device 210, which is likewise used in a vending machine for French fried potatoes. The device 210 has a granule hopper 212, which is filled with potato granules and is filled with potato granules sufficient for about 100 portions before the vending machine is put into operation. A metering unit 216 is mounted at an outlet opening 214 at the bottom end of the granule hopper 212, the said end being shown on the left in FIG. 16. The metering unit 216 is connected to a chamber 220 by a granule chute 218.

The chamber 220 has a vertical hollow cylinder 222 of circular cross section which is open at both ends and has in its lateral surface a feed opening 224 at which the granule chute 218 ends. At its open upper end, the cylinder 222 is closed by a cap 226, which is screwed to a radially projecting flange 228 running around the cylinder 222.

A piston 230, the piston rod 232 of which projects from the cylinder 222 through a guide hole 234 formed in the cap 226 and is guided in a guide 236 which is mounted on the cap 226 and projects upwards vertically, can be moved in the cylinder 222 in the direction of its longitudinal axis L. Formed on the piston rod 232 there are teeth 238 which mesh with a gearwheel 240 of a piston drive 242 mounted on the cap 226.

The lower end of the cylinder 222 is open and is used as a discharge opening 244 of the chamber 220 for the fully mixed edible dough. A radially projecting encircling second flange 246 is welded to the cylinder 222 somewhat above the discharge opening 244. A forming device 248 is mounted on this second flange 246. This forming device 248 has two pairs of holders 250a, 250b and 252a, 252b. The holders of each pair 250a, 250b and 252a, 252b are arranged at a distance from one another and each hold a round bar 254 and 256 respectively. The pairs of holders 250a, 250b and 252a, 252b in turn are arranged in such a way that the two round bars 254 and 256 are arranged parallel to one another with respect to both sides of the cylinder 222. The round bars 254 and 256 are used as a tensioning device for a wire 258 which is stretched across the discharge opening 244 and rests against the lower end face of the cylinder 222. This wire 258 is stretched backwards and forwards several times between the two round bars 254 and 256, the individual sections of wire being arranged parallel to one another and at a distance apart in the region of the discharge opening 244. The surface of the wire 258 is coated with Teflon.

Arranged underneath the cylinder 222 is a closing plate 260, which is screwed to the outlet shaft of a gear unit 262 mounted on the frame (not shown) of the device 210, next to the cylinder 222. The gear unit 262 meshes with an electric drive 266 via a gear pair 264. When the drive 266 is actuated, the closing plate 260 is pivoted about the pivoting axis R of the gear unit 262 by the gear unit 262. To prevent sagging of the closing plate 260 in the region of the cylinder 222, a pair of rollers 268 which rests under preload against the underside of the closing plate 260 and presses it against the end face of the cylinder 222 is mounted on the housing (not shown) of the device 210, as shown on the right in FIG. 17. The structure of the closing plate 260 corresponds to that of the closing plate 42 shown in FIGS. 4 and 5, and it is therefore possible to dispense with an exact description of the closing plate 260.

The device 210 is furthermore fitted with a rehydration unit 286, by means of which the water required for mixing the edible dough is sprayed into the chamber 220. As shown, in particular, in FIG. 17, the rehydration unit 286 employs a water container 288 which is connected by a valve 290 to a fresh-water conduit 292, which is under a line pressure of about 4 bar. A filter insert 294, by means of which the fresh water flowing into the water container 288 is purified, is arranged in the water container 288 at the connection of the water container 288 for the fresh-water conduit 292.

The water in the water container 288 is heated to an operating temperature of 85° C. by a heating coil 296 projecting into the water container 288. The water container 288 is connected to a distributor manifold 300 by a feed line 298. A solenoid valve 302 and a flow meter 304 are arranged in the feed line 298. The solenoid valve 302 regulates the quantity of water sprayed into the cylinder 222 at a pressure of 1.5 to 2 bar, the flow meter 304 determining the quantity of water and activating the solenoid valve 302 by means of a control device (not shown) in accordance with a predetermined mixing ratio of food granules and water.

The distributor manifold 300 is connected by three connecting lines 306a, 306b and 306c to three injection nozzles mounted on the cylinder 222, only injection nozzle 308 being shown in FIGS. 16 and 17. The injection nozzle 308 is inserted in such a way into a location opening 310 running obliquely through the shell of the cylinder 222 that the jet of water emerging from the injection nozzle 308 enters the cylinder 222 obliquely at an angle of 25° C. to 30°0 C. to the normal to the lateral surface of the cylinder 222, i.e. is aligned along a secant plane extending parallel to the longitudinal axis L of the cylinder 222. In addition, as illustrated in FIG. 16, the injection nozzle 308 is inclined at an angle α of 15 to 25° C. to the longitudinal axis L of the cylinder 222.

Figure 18:
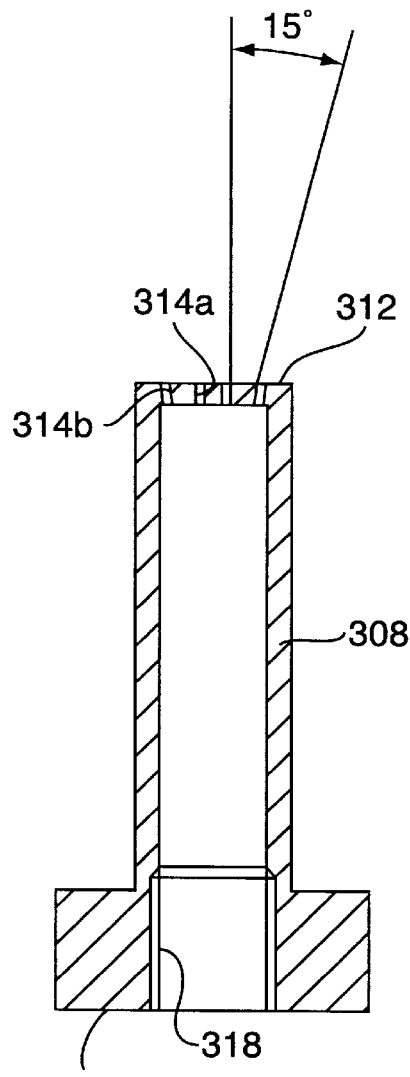
FIG. 18 is a sectional view of an injection nozzle used in the device shown in FIG. 16.
Figure 19:
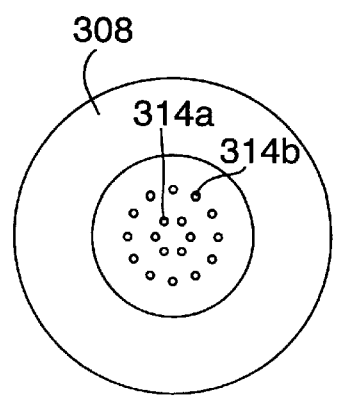
FIG. 19 is a plan view of the injection nozzle shown in FIG. 18.

As shown in FIG. 18, the injection nozzle 308 has a plurality of outlet holes 314a and 314b in its end face 312 facing the cylinder 222, these holes being formed in two groups concentrically around a common centre (cf. FIG. 19). The outlet holes 314b of the group at the greatest distance from the centre are inclined at an angle of 150 to the end face 312 of the injection nozzle 308. An internal thread 318, into which the connecting line 306a is screwed in a sealed manner, is formed on the connection end 316 of the injection nozzle 308, the said end facing away from the end face 312.

The operation of the device 210 is explained in the text which follows. As soon as the vending machine has been activated, by insertion of a sum of money for example, the metering unit 216 takes a predetermined portion of food granules from the granule hopper 212. The portion of food granules slides out of the metering unit 216, along the granule chute 218, via the feed opening 224 into the cylinder 222 of the chamber 220, the discharge opening 244 of which is closed by the closing plate 260. At this point in time, the piston 230 is in the charging position, i.e. the piston 230 has been moved upwards until the feed opening 224 is exposed. Once the cylinder 222 has been filled with food granules, the piston drive 242 is actuated and moves the piston 230 into the mixing position, in which it is underneath the feed opening 224.

Once the piston 230 has reached the mixing position, the solenoid valve 302 opens the feed line 298, with the result that water is sprayed into the interior of the cylinder 222 at a pressure of 1.5 to 2 bar via the injection nozzles 308. The oblique and sloping arrangement of the injection nozzles 308 generates in the cylinder 222 a circular flow which takes the food granules along with it. This gives rise to a stirring or mixing movement by means of which the food granules are uniformly mixed with the water heated to 80 to 85° C. While the water is flowing into the injection nozzles 308 via the feed line 298, the flow meter 304 measures the quantity of water flowing through the feed line 298. If the quantity of water which has already been sprayed into the cylinder 222 corresponds to the quantity required for an optimum mixing ratio, the solenoid valve 302 shuts off the feed line 298.

Once injection via the injection nozzles 308 is ended, the piston drive 242 is reactivated, with the result that the piston 230 is lowered in the cylinder into a compaction position, in which the edible dough is compacted with a predetermined force. The force actually acting is measured during this operation by evaluating the motor current of the piston drive 242 required to hold the piston 230 in the compacting position when the predetermined force is reached.

Once compaction is complete, dough discharge and dough cutting are started, this corresponding to the first embodiment. The cut dough strips which form the raw French fried potatoes fall into a fryer 320 arranged underneath the cylinder 222 and are fried therein.

Dough discharge and dough cutting are repeated until the piston 230 has reached its end position, in which it rests against the wire 258 stretched across the discharge opening 244. The piston 230 is then retracted into the charging position and the closing plate 260 is pivoted back into its initial position, in which it closes the discharge opening 244. In the meantime, the French fried potatoes are cooked fully in the fryer 320, then removed from the fryer 320 and dispensed via a dispensing unit (not shown).

It is also possible for the various units in the devices shown in FIGS. 1 to 3 and FIGS. 16 to 19 to be interchanged. The use of the granule chutes shown in FIGS. 10 to 13 in the device shown in FIGS. 16 to 19 is also conceivable, for instance, and the forming device 248 in FIGS. 16 and 17 can be used in the device shown in FIGS. 1 and 2.

What is claimed is:

1. The method for rehydrating a predetermined quantity of food granules fed into a chamber with a predetermined quantity of water also fed into the chamber, with the food granule/water mixture being compacted in the chamber and discharged from it, said method comprising the following sequence of steps before compaction of the granule/water mixture:

a) feeding a first portion of the food granules, which forms a first layer, into the chamber, b) spraying a first portion of water onto the first layer, said first portion of water being dimensioned such that water collects in the upper regions of the first layer, and c) feeding at least one further portion of the food granules into the chamber and spraying said further portion of the food granules with a further portion of the water.

2. The method according to claim 1, including:

in step c) feeding a plurality of further portions of food granules to form a plurality of layers above the first layer, and after the formation of each further layer above the first layer, spraying the respective further layer with a further portion of the water.

3. The method according to claim 1, including:

spraying the food granules fed into the chamber in step c) with water as the food granules are fed into the chamber.

4. The method according to claim 2, including:

depositing only one further layer of granules on the first layer of granules before the quantity of food granules in the chamber reaches the predetermined quantity.

5. The method according to claim 1, including:

spraying the water at least partially in a direction normal to the bottom of the chamber.

6. The method according to claim 1, including:

spraying the water at least partially in a direction to cause a circular flow of water and food granules in the chamber about a vertical axis and also in an oblique direction relative to a normal to the bottom of the chamber.

7. The method according to claim 1, including:

spraying the water onto the first layer and onto the at least one further portion or remainder of the food granules as a fine shower, the droplets of which shower have a mean volumetric diameter of 0.5 to 1.5 mm, at a mean water pressure of 2 to 3 bar.

8. The method according to claim 1, including:

in steps b) and c) performing said spraying of water using a nozzle having a cavity that tapers in the direction of flow, having a nozzle outlet opening which is connected to the cavity and points in the direction of the bottom of the chamber, and having a separation edge which is acute-angled in cross section and which atomizes the water flowing out of the nozzle.

* * * * *